United States Patent
Dvir et al.

(10) Patent No.: US 9,135,104 B2
(45) Date of Patent: *Sep. 15, 2015

(54) IDENTIFYING FRUSTRATION EVENTS OF USERS USING A COMPUTER SYSTEM

(75) Inventors: Tomer Dvir, Netanya (IL); Ishay Green, Tel-aviv (IL); Omer Baki, Tel-Aviv (IL); Roee Adler, Shoham (IL)

(73) Assignee: SOLUTO LTD, Tel Aviv (IL)

( * ) Notice: Subject to any disclaimer, the term of this patent is extended or adjusted under 35 U.S.C. 154(b) by 291 days.

This patent is subject to a terminal disclaimer.

(21) Appl. No.: 12/751,544

(22) Filed: Mar. 31, 2010

(65) Prior Publication Data

US 2010/0257543 A1    Oct. 7, 2010

Related U.S. Application Data

(60) Provisional application No. 61/213,453, filed on Jun. 10, 2009, provisional application No. 61/202,750, filed on Apr. 1, 2009.

(51) Int. Cl.
G06F 11/07 (2006.01)
G06F 11/34 (2006.01)

(52) U.S. Cl.
CPC .......... *G06F 11/0793* (2013.01); *G06F 11/079* (2013.01); *G06F 11/0715* (2013.01); *G06F 11/3438* (2013.01)

(58) Field of Classification Search
None
See application file for complete search history.

(56) References Cited

U.S. PATENT DOCUMENTS

| 7,266,726 | B1 * | 9/2007 | Ladd et al. ................ 714/27 |
| 7,640,547 | B2 | 12/2009 | Neiman et al. |
| 8,156,502 | B1 | 4/2012 | Blanding |
| 8,812,909 | B2 | 8/2014 | Dvir et al. |
| 2002/0165892 | A1 * | 11/2002 | Grumann et al. ............ 709/100 |
| 2003/0139905 | A1 * | 7/2003 | Helsper et al. ............... 702/182 |
| 2004/0103193 | A1 | 5/2004 | Pandya et al. |
| 2004/0107193 | A1 | 6/2004 | Tremblay |
| 2004/0176991 | A1 | 9/2004 | McKennan et al. |
| 2004/0226015 | A1 | 11/2004 | Leonard et al. |
| 2005/0222819 | A1 | 10/2005 | Boss et al. |

(Continued)

OTHER PUBLICATIONS

Ceaparu et al., "Determining Causes and Severity of End-User Frustration," May 12, 2002, retrieved on Apr. 4, 2014, retrieved from the Internet <URL: http://www.cs.umd.edu/~ben/papers/Ceaparu2004Determining.pdf>, 21 pages.

(Continued)

*Primary Examiner* — Tuan Dao
(74) *Attorney, Agent, or Firm* — Fish & Richardson P.C.

(57) ABSTRACT

A data processing system comprising: a constantly updating database of a plurality of processes having a plurality of operation times, relating to a plurality of applications, relating to at least one user activity, and using a plurality of computing resources; a process clash identifier arranged to monitor relationships among the plurality of processes in respect to their operation times and the computing resources used by each process, and to identify clashes between the processes in respect to the operation times and in respect to the computing resources; a frustration events identifier arranged to identify frustration events relating to the at least one user activity, a frustration event being related to expectations of the user in relation to the user activities and being defined by specified criteria; and a correlator arranged to correlate the identified frustration events with the identified clashes between processes.

20 Claims, 2 Drawing Sheets

(56) References Cited

U.S. PATENT DOCUMENTS

| | | |
|---|---|---|
| 2007/0179791 A1* | 8/2007 | Ramesh et al. .................... 705/1 |
| 2007/0240161 A1 | 10/2007 | Prabhakar et al. |
| 2008/0092122 A1* | 4/2008 | Caprihan et al. ............. 717/127 |
| 2008/0155074 A1* | 6/2008 | Bacinschi .................... 709/222 |
| 2008/0172419 A1* | 7/2008 | Richards et al. ............. 707/200 |
| 2008/0222647 A1 | 9/2008 | Taylor et al. |
| 2008/0294423 A1 | 11/2008 | Castellani et al. |
| 2009/0055340 A1 | 2/2009 | Lakshminarayanan et al. |
| 2009/0157513 A1* | 6/2009 | Bonev et al. .................... 705/14 |
| 2009/0183168 A1 | 7/2009 | Uchida |
| 2009/0249497 A1* | 10/2009 | Fitzgerald et al. ............. 726/35 |
| 2010/0082516 A1 | 4/2010 | Basu et al. |
| 2010/0121954 A1* | 5/2010 | Yang et al. .................... 709/225 |
| 2010/0131959 A1 | 5/2010 | Spiers et al. |
| 2010/0169893 A1 | 7/2010 | Collins et al. |
| 2010/0257185 A1 | 10/2010 | Dvir et al. |
| 2010/0257527 A1 | 10/2010 | Dvir et al. |
| 2010/0257533 A1 | 10/2010 | Dvir et al. |

OTHER PUBLICATIONS

Lazar et al., "Severity and Impact of Computer User Frustration: A Comparison of Student and Workplace Users," Dec. 23, 2004, retrieved on Apr. 4, 2014, retrieved from the Internet <URL: https://www.cs.umd.edu/~ben/papers/Lazar2006Severity.pdf>, 26 pages.

Scheirer et al., "Frustrating the User on Purpose: A Step Toward Building an Affective Computer," Interacting with Computers, 2002, 14:93-118.

* cited by examiner

IDENTIFYING FRUSTRATION EVENTS OF USERS USING A COMPUTER SYSTEM

CROSS REFERENCE TO RELATED APPLICATIONS

This application claims the benefit of U.S. Provisional Patent Application 61/202,750 filed on Apr. 1, 2009 and U.S. Provisional Patent Application 61/213,453 filed on Jun. 10, 2009, which are incorporated herein by reference.

BACKGROUND

1. Technical Field

The present invention relates to the field of computing, and more particularly, to enhancing operating system's efficacy.

2. Discussion of Related Art

Currently, the typical experience of using a personal computer (PC) is of frustration. Frustration may be caused by PC irresponsiveness to a command by the User (e.g.—delayed performance of tasks requested by the User, etc.) or by processing data unrequested by the User (e.g.—invisible resource-intensive background processes, appearance of unrequested programs as pop-ups, etc.). Presently these types of frequently recurring events are not addressed, nor even acknowledged by the PC. While systems for recording isolated, extreme software crash incidents are available, there is no method for monitoring, detection and fixing the standard, commonplace PC upsets that cause ongoing PC usage frustration.

The frustrating performance occurs regardless of the operating system ("OS") running on the PC (e.g.—Windows, MacOS, Linux, etc.). The current OS all share the basic trait of arbitrarily determining the sequence of actions to which the PC will direct its processing resources. This characteristic also enables SW manufacturers to design their products to independently claim PC resources without the active involvement of the user. This mode of operation often repeatedly gives the typical user a sense of lack of control over his PC, causing frustration with PC usage.

BRIEF SUMMARY

Embodiments of the present invention provide a data processing system comprising: a constantly updating database of a plurality of processes having a plurality of operation times, relating to a plurality of applications, relating to at least one user activity, and using a plurality of computing resources; a process clash identifier arranged to monitor relationships among the plurality of processes in respect to their operation times and the computing resources used by each process, and to identify clashes between the processes in respect to the operation times and in respect to the computing resources; a frustration events identifier arranged to identify frustration events relating to the at least one user activity, a frustration event being related to expectations of the user in relation to the user activities and being defined by specified criteria; and a correlator arranged to correlate the identified frustration events with the identified clashes between processes.

Embodiments of the present invention provide a computer implemented method comprising: monitoring relationships among a plurality of processes in respect to operation time and computing resources; identifying clashes between processes in respect to operation time and computing resources; relating at least some of the processes with at least one user activity; identifying frustration events relating to the at least one user activity; and correlating the identified frustration events with the identified clashes between processes, wherein the monitoring, the identifying clashes, the relating, the identifying frustration events, and the correlating are carried out substantially immediately during running the processes, and wherein at least one of: the monitoring; the identifying clashes; the relating; the identifying frustration events; and the correlating, is performed by at least one computer.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
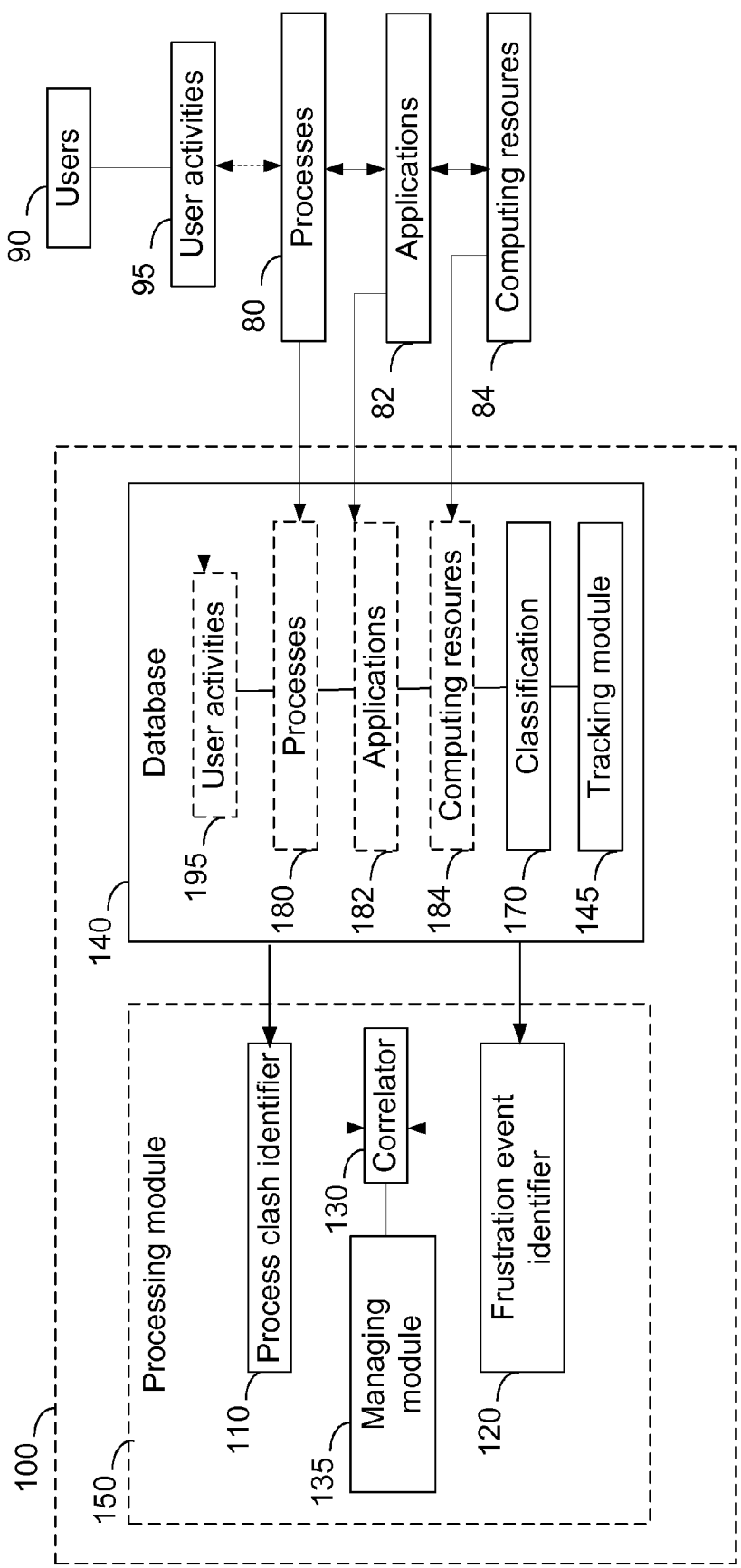
FIG. 1 is a high level schematic block diagram of a data processing system, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention relates to processes 80 relating to user activities 95 of users 90, and to the processing of applications 82 on computing resources 84, e.g., within an operating system (OS).

FIG. 1 is a high level schematic block diagram of a data processing system 100, according to some embodiments of the invention. Data processing system 100 comprises a constantly updating database 140 of a plurality of processes 180 (corresponding to processes 80) relating to a plurality of applications 182 (corresponding to applications 82) and using a plurality of computing resources 184 (corresponding to computing resources 84), at least some of processes 180 relating to at least one user activity 195 (corresponding to user activities 95).

Database 140 may embody an inventory ("Catalog") (based on a local/remote database or another repository) compiling information of every object run or processed by the PC ("Catalog Item"), for example software applications, hardware devices, online services, multimedia codecs, web applications, drivers, plug-ins, and more, creating a common basis for data analysis within the PC over time and between different PCs. The Catalog enables the system to attribute specific partial processes to an object, and analyze process behavior in the context of the full catalog item. Examples of the type of information collected for each catalog item may include: a list of related binary executable files, its typical method of usage, operational costs when the catalog item resides on the PC, descriptive text and image resources, aggregated world-wide usage level, etc.

Database 140 may comprise a tracking module 145 arranged to monitor and analyze the relevant real-time and none real-time data regarding process' requirements, processing resources availability and user's priorities, and constantly shape the processing schedule. Tracking module 145 may further track the computer and user activity providing real-time and none real-time data regarding process' requirements, processing resources availability and user's priorities.

Tracking module 145 may comprise a client primarily maps the PC inventory and creates the local database. The client continuously monitors and records inventory items' usage and changes, serving for background performance benchmarking, and creating the typical user usage preferences profiles. It may be synchronized with the system database. The client is continually tracking and analyzing usage data regarding each active catalog item. Such data may be PC resource (e.g. CPU, RAM. Storage I/O, Network, etc.) usage; typical user interaction with that particular item; correlating usage of items; and more. These data serve to deduce user' real-time preferences and the PC processing resources applied to these preferences.

Data processing system 100 further comprises a process clash identifier 110 arranged to monitor relationships among processes 80 in respect to their operation times and computing resources 84 used by each process 80, and to identify clashes between processes 80 in respect to the operation times and in respect to computing resources 84.

Data processing system 100 further comprises a frustration events identifier 120 arranged to identify frustration events relating to user activities 95, a frustration event being related to expectations of user 90 in relation to user activities 95 and being defined by specified criteria such as waiting time, user activity 95's prosecution time, application 82's response times etc.

Frustration events identifier 120 may comprise a heuristic mechanism having means of analyzing in real time the discrepancy between the user's requirement of a catalog item's processing and the actual PC resources allotted to this procedure, and recording such events ("Frustration Detector"). Preferably, the Frustration Detector is capable of tracking ongoing PC activity and ongoing user activity (using designated probes, such as a file system driver, user interaction, network activity, etc.) and providing the relevant data for the analysis process. When a significant discrepancy between the user' real-time preferences and the PC processing resources applied to these preferences occurs, a frustration event is detected by Frustration events identifier 120.

Frustration events identifier 120 may record Frustration event data (e.g.—the frustration type (low responsiveness, long loading & processing time, stolen focus, crash, device error, high resources use); as well as processes suspected to be at the cause of the event; resources used at a high level that annoyed the user and triggered the event; processes are being used, and expected to serve the user; Frustration level—How annoying and/or intrusive is the frustration; etc.), and any additional data that may assist in understanding the frustration and its root causes. Optionally, a unique ID is generated, based on the nature of the frustration cause, effect and additional information categorizing the specific frustration. These data may be logged in a local storage.

Data processing system 100 further comprises a correlator 130 arranged to correlate the identified frustration events with the identified clashes between processes 80.

Data processing system 100 may further comprises a managing module 135 arranged to integrate data from correlator 130, analyze the correlated frustration events and process clashes and generate an overview of these events.

In embodiments, data processing system 100 may comprise a processing module 150 comprising process clash identifier 110, frustration events identifier 120, correlator 130 and managing module 135, that is arranged to identify and monitor process clashes and frustration events. Processing module 150 and database 140 may be embodied within the operating system or as external modules communicating therewith.

Data processing system 100 provides ongoing monitoring and detection of all frustration causing clashes between processes in the background. Data processing system 100 learns the typical usage habits of the user and thereby identifies processes which are not relevant to the user's current need and expected PC performance, but are concurrently running on the PC. Managing module 135 may analyze and aggregate single, unique Frustration Events into general phenomena ranked according to frequency and severity of frustration.

According to some embodiments of the invention, data processing system 100 may further comprise a scoring module (not shown) configured to apply a scoring function to the identified frustration events to yield respective frustration levels being quantitative representation of the frustration events. the scoring function may comprise at least one of: a weighting function associating characteristics of the user and a weighting function associating specified general characteristics of a human behavior. Optionally, the characteristics of the user are learnable during the user's usage of the computer system.

According to some embodiments of the invention, data processing system 100 may further comprise a monitoring module configured to monitor usage patterns of the user to identify frustration reducing operations being user operations sequences associated with a reduction in the frustration level below a specified level.

According to some embodiments of the invention, data processing system 100 may further comprise a sharing module configured to apply a sharing function to the identified frustration reducing operations to yield implementation of the identified frustration reducing operations on other computer systems in communication with the computer system. Optionally, the other computer systems are registered to a service enabling the sharing function thereon.

Figure 2:
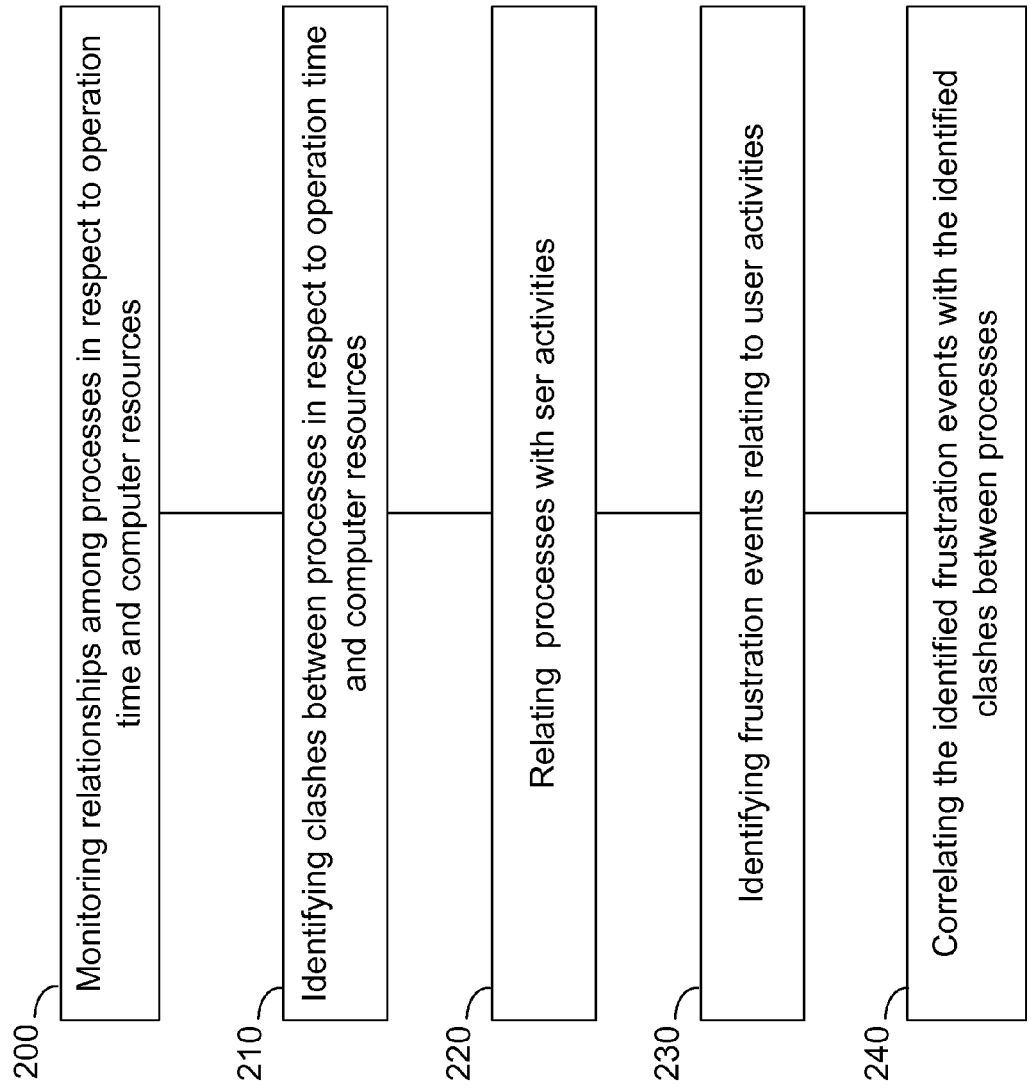
FIG. 2 is a high level flowchart illustrating a computer implemented method according to some embodiments of the invention.

FIG. 2 is a high level flowchart illustrating a computer implemented method according to some embodiments of the invention. The computer implemented method comprises the following stages: monitoring relationships among a plurality of processes in respect to operation time and computing resources (stage 200); identifying clashes between processes in respect to operation time and computing resources (stage 210); relating at least some of the processes with at least one user activity (stage 220); identifying frustration events relating to the at least one user activity (stage 230); and correlating the identified frustration events with the identified clashes between processes (stage 240). Stages 200-240 are carried out substantially immediately during running the processes, and at least one of the stages 200-240 is performed by at least one computer.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computer implemented method in a computer system comprising:
    monitoring relationships among a plurality of processes that result from ongoing human user activities initiated by a human user using the computer system, the monitoring in respect to operation times and computing resources of the computer system;
    identifying specific clashes between specific ones of the processes in respect to the operation times and the computing resources;
    relating at least some of the processes with at least one user activity of the ongoing human user activities;
    identifying in real time, using designated probes, frustration events relating to real time human user expectations in respect to waiting time, prosecution time, and/or response time of the at least one user activity;
    recording frustration levels and frustration types for the frustration events, the frustration levels being quantitative representations of the frustration events, the frustration types representing respective types of the frustration events; and
    correlating the identified frustration events with the identified clashes,
    wherein the monitoring, the identifying clashes, the relating, the identifying frustration events, and the correlating are carried out during running of the processes, and
    wherein at least one of: the monitoring; the identifying clashes; the relating; the identifying frustration events; and the correlating, is performed by at least one computer.

2. The method according to claim 1, comprising: applying a scoring function to the identified frustration events to respectively yield the frustration levels.

3. The method according to claim 2, wherein the scoring function comprises at least one of: a weighting function associating characteristics of the user and a weighting function associating specified general characteristics of a human behavior.

4. The method according to claim 2, wherein the scoring function comprises a weighting function associating characteristics of the user which are learnable during the user's usage of the computer system.

5. The method according to claim 2, further comprising monitoring usage patterns of the user to identify frustration reducing operations being user operations sequences associated with a reduction in the frustration level below a specified level.

6. The method according to claim 5, further comprising applying a sharing function to the identified frustration reducing operations to yield implementation of the identified frustration reducing operations on other computer systems in communication with the computer system.

7. The method according to claim 6, wherein the other computer systems are registered to a service enabling the sharing function thereon.

8. A data processing system comprising:
    a computer processor;
    a constantly updating database of a plurality of processes having a plurality of operation times, relating to a plurality of applications, relating to at least one user activity initiated by a human user, and using a plurality of computing resources on a computer system;

a process clash identifier configured to monitor relationships among the plurality of processes in respect to the operation times and the computing resources used by each process, and to identify specific clashes between the processes in respect to the operation times and in respect to the computing resources;

a frustration events identifier configured to identify in real time, based on one or more designated probes, frustration events relating to the at least one user activity, a frustration event being related to real time expectations of the user in relation to the user activities and being defined by specified criteria including at least one of waiting time, prosecution time, and/or response time;

a module configured to determine frustration levels and frustration types for the identified frustration events, the frustration levels being quantitative representations of the identified frustration events, the frustration types representing respective types of the frustration events; and a correlator configured to correlate the identified frustration events with the identified clashes, wherein the constantly updating database; the process clash identifier; the frustration events identifier; and the correlator, are arranged to operate during running of the processes, and wherein the process clash identifier; the frustration events identifier; and the correlator, are executed by the computer processor.

9. The system according to claim 8, wherein the module comprises a scoring module that is configured to apply a scoring function to the identified frustration events to respectively yield the frustration levels.

10. The system according to claim 9, wherein the scoring function comprises at least one of: a weighting function associating characteristics of the user and a weighting function associating specified general characteristics of a human behavior.

11. The system according to claim 9, wherein the scoring function comprises a weighting function associating characteristics of the user which are learnable during the user's usage of the computer system.

12. The system according to claim 8, farther comprising a monitoring module configured to monitor usage patterns of the user to identify frustration reducing operations being user operations sequences associated with a reduction in the frustration level below a specified level.

13. The system according to claim 12, further comprising a sharing module configured to apply a sharing function to the identified frustration reducing operations to yield implementation of the identified frustration reducing operations on other computer systems in communication with the computer system.

14. The system according to claim 13, wherein the other computer systems are registered to a service enabling the sharing function thereon.

15. A computer program product comprising: a computer readable hardware storage medium including a computer readable program, the computer readable program comprising:

computer instructions configured to repeatedly update a database of a plurality of processes having a plurality of operation times, relating to a plurality of applications relating to at least one user activity initiated by a human user, and using a plurality of computing resources on a computer system;

computer instructions configured to monitor relationships among the plurality of processes in respect to the operation times and the computing resources used by each process, and to identify specific clashes between the processes in respect to the operation times and in respect to the computing resources;

computer instructions configured to identify in real time, based on one or more designated probes, frustration events relating to the at least one user activity, a frustration event being related to real time expectations of the user in relation to the user activities and being defined by specified criteria including at least one of waiting time, prosecution time, and/or response time;

computer instructions configured to record frustration levels and frustration types for the identified frustration events, the frustration levels being quantitative representations of the identified frustration events, the frustration types representing respective types of the frustration events; and computer instructions configured to correlate the identified frustration events with the identified clashes, wherein the computer readable program is arranged to operate during running of the processes.

16. The computer product according to claim 15, further comprising computer instructions configured to apply a scoring function to the identified frustration events to respectively yield the frustration levels.

17. The computer product according to claim 16, wherein the scoring function comprises at least one of: a weighting function associating characteristics of the user and a weighting function associating specified general characteristics of a human behavior.

18. The computer product according to claim 16, wherein the scoring function comprises a weighting function associating characteristics of the user which are learnable during the user's usage of the computer system.

19. The computer product according to claim 16, further comprising computer instructions configured to monitor usage patterns of the user to identify frustration reducing operations being user operations sequences associated with a reduction in the frustration level below a specified level.

20. The computer product according to claim 19, further comprising computer instructions configured to apply a sharing function to the identified frustration reducing operations to yield implementation of the identified frustration reducing operations on other computer systems in communication with the computer system.

* * * * *